United States Patent [19]
Loomis, Jr. et al.

[11] 3,762,253
[45] Oct. 2, 1973

[54] DUAL LANE PACKAGING MACHINE

[75] Inventors: Clifford R. Loomis, Jr.; Jerald R. Wiles; Russell A. Newton, Rockford, Ill.

[73] Assignee: Rexham Corporation, New York, N.Y.

[22] Filed: Nov. 12, 1971

[21] Appl. No.: 198,226

[52] U.S. Cl. .................... 83/102, 83/154, 83/220, 83/236, 83/401, 83/560, 83/602, 83/605, 83/649
[51] Int. Cl. ................................. B26d 5/20
[58] Field of Search ................ 83/23, 42, 102, 154, 83/219, 220, 235, 236, 401, 560, 602, 605, 649

[56] References Cited
UNITED STATES PATENTS

| | | | |
|---|---|---|---|
| 1,880,935 | 10/1932 | Elliot et al. | 83/220 X |
| 2,170,255 | 8/1939 | Sheperdson | 83/102 X |
| 3,248,978 | 5/1966 | Muller | 83/220 X |

*Primary Examiner*—Frank T. Yost
*Attorney*—Wolfe, Hubbard, Leydig, Voit & Osann, Ltd.

[57] ABSTRACT

The pouches of an advancing strip of interconnected pouches are divided into two rows or lanes by shuttling the leading end portion of the strip between laterally spaced clamps and by gripping alternate leading pouches in alternate clamps prior to cutting the pouches from the strip and advancing the pouches with the clamps. Also disclosed are means for preventing slack in the strip and for keeping the upper ends of the pouches spread apart during the shuttling, means for opening the clamps, means for sealing the upper ends of the pouches of both lanes in a single station, and means for assisting in unwinding from a supply roll the pouch web from which the strip is formed.

9 Claims, 22 Drawing Figures

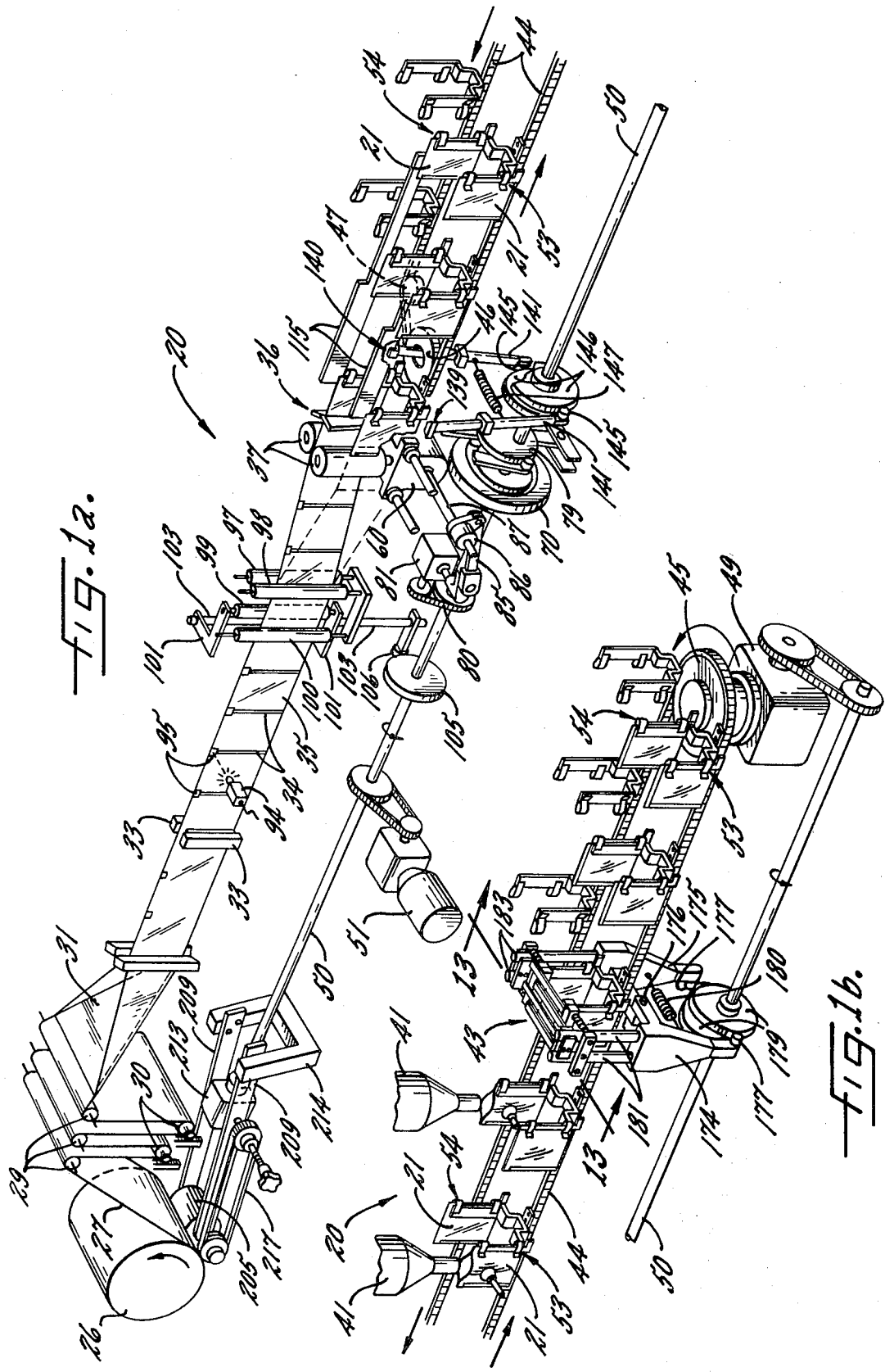

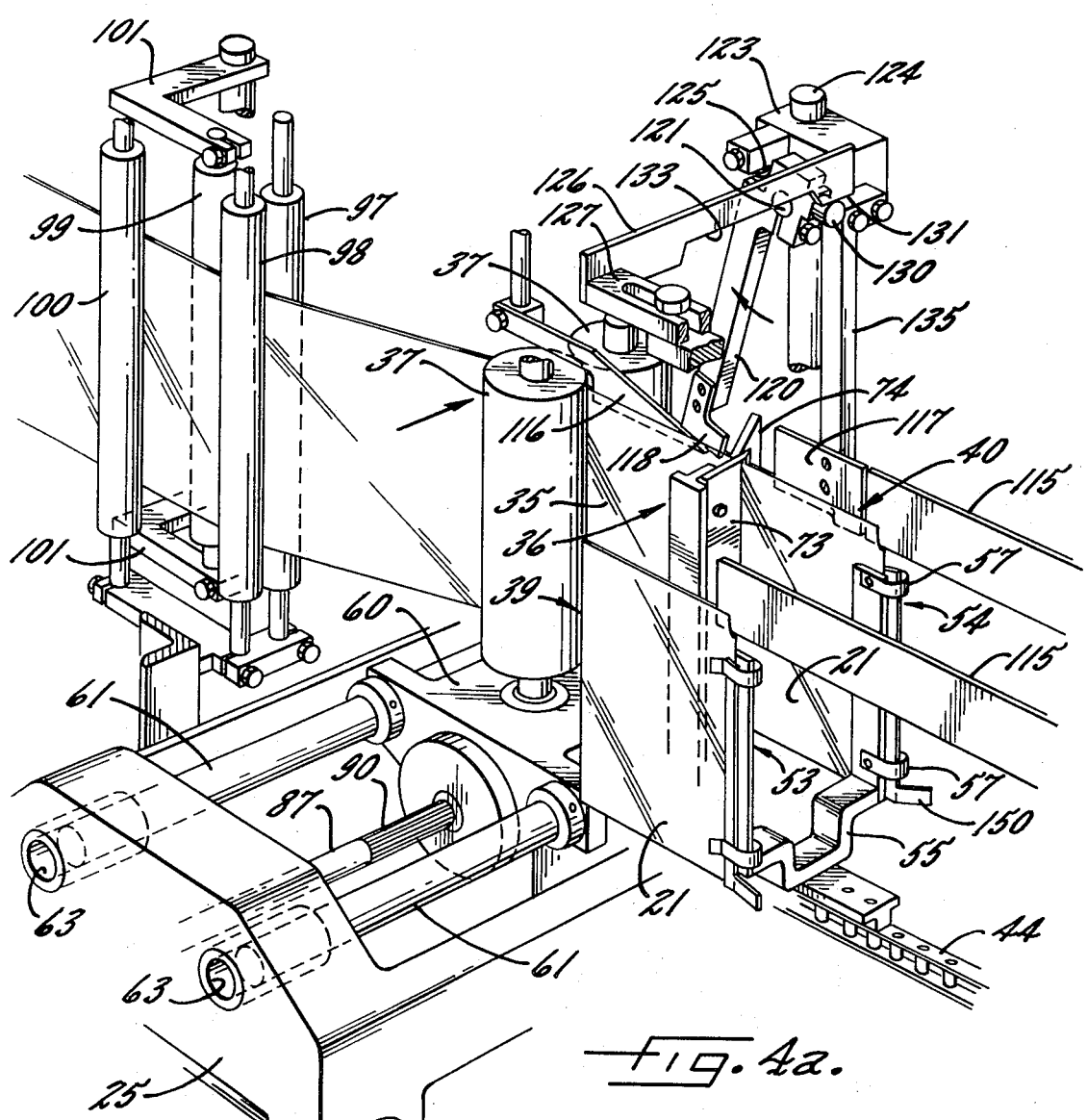
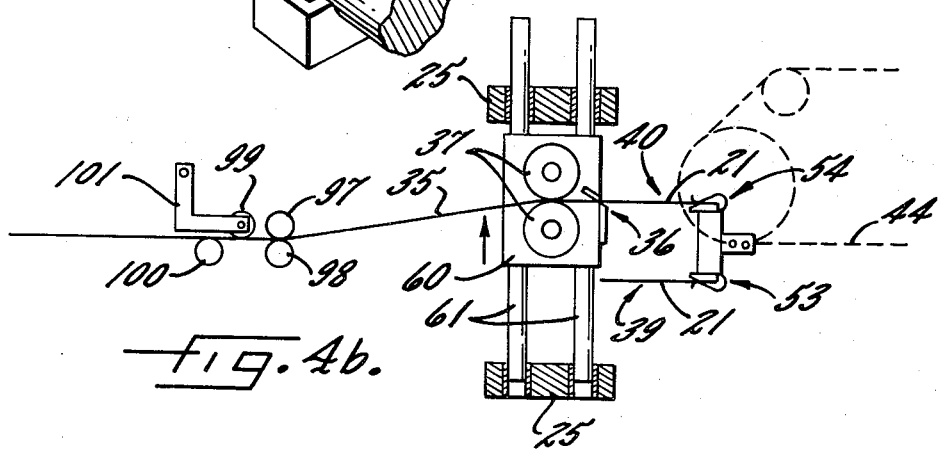
fig. 4a.
fig. 4b.

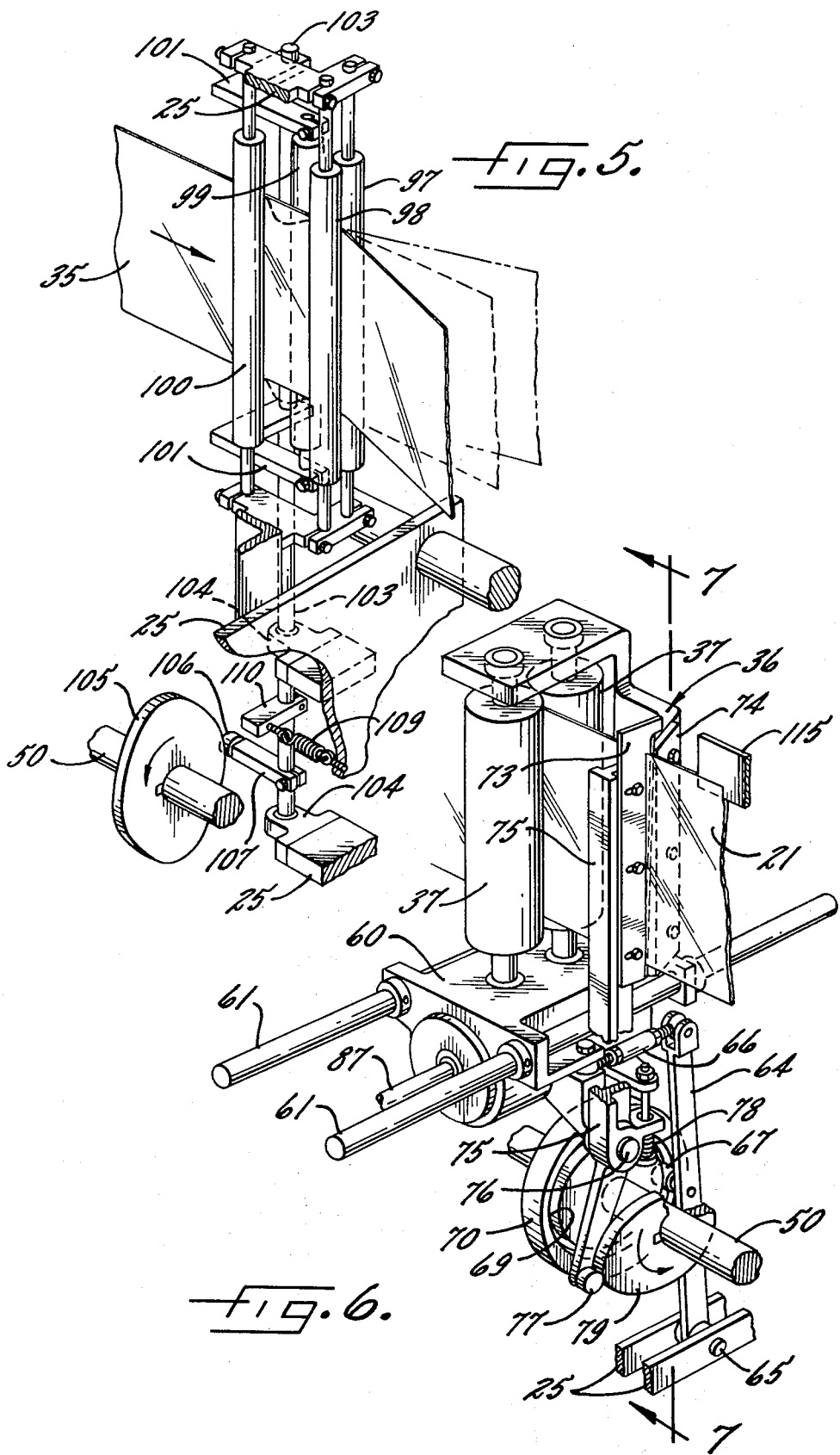

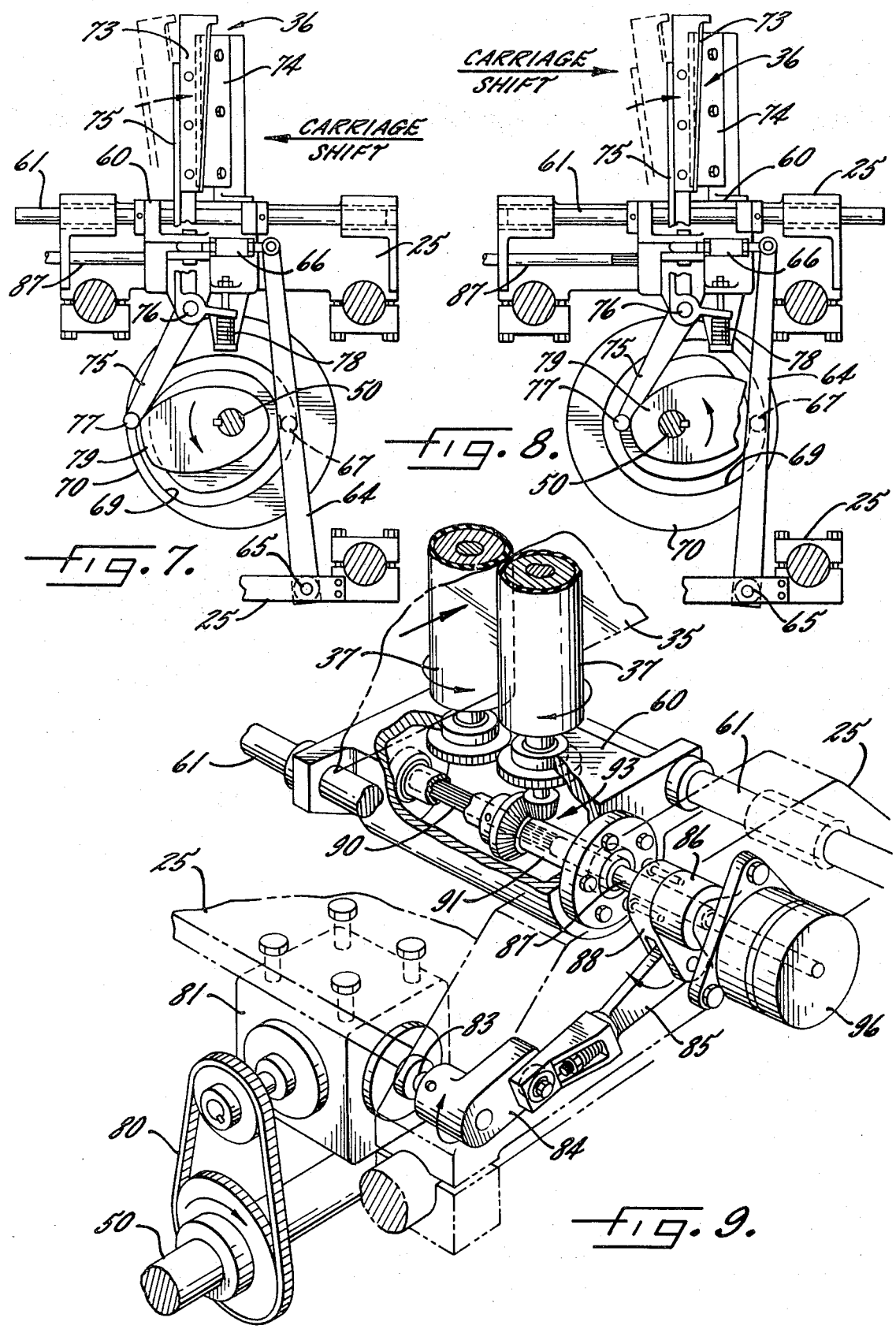

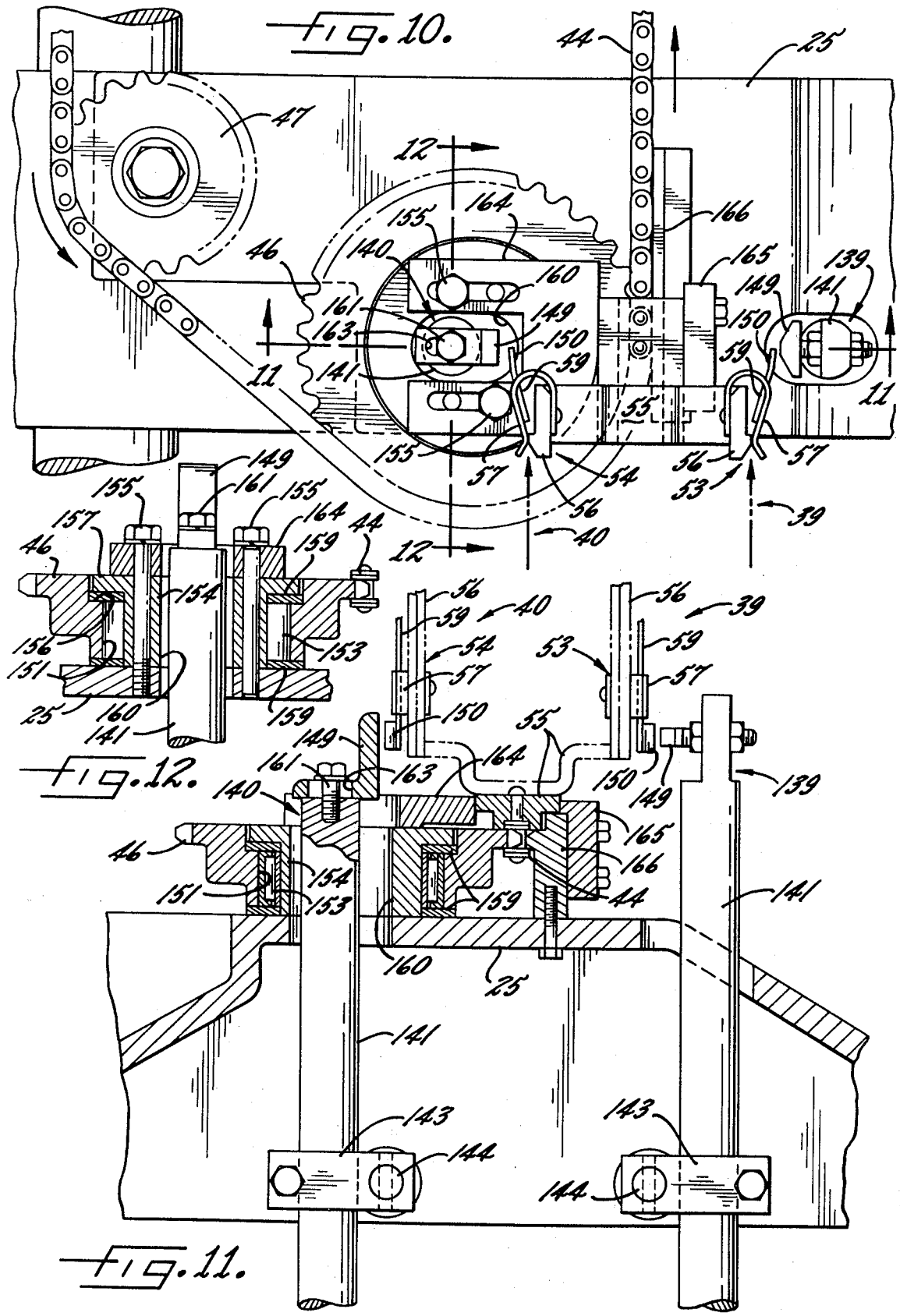

DUAL LANE PACKAGING MACHINE

BACKGROUND OF THE INVENTION

This invention relates to a packaging machine and more particularly to a packaging machine in which a web of material is drawn from a supply roll by a pair of feed rollers and is converted into a strip of interconnected pouches adapted to be advanced along a predetermined path by the feed rollers. Periodically, the leading pouches are severed from the strip, are divided into two side-by-side rows, and are advanced by grippers through side-by-side filling stations where the pouches in the two rows are filled with product. After the pouches have advanced through the filling stations, their open ends are sealed to enclose the product in the pouches.

Such a machine is conventionally referred to as a dual lane machine in that the pouches are divided into two lanes or rows after being formed while in a single row. The pouch forming operations inherently can be achieved much faster than the pouch filling stations and thus a dual lane machine is advantageous since a single pouch making line running at high speed can supply its output of pouches to two pouch filling lines each running at half the speed of the pouch making line and at a speed which is compatible with the time required for filling of the pouches. With this arrangement, a single dual lane machine can substantially duplicate the output of two separate single lane machines and yet the cost of the dual lane machine is considerably lower than the combined cost of the separate machines since only a single pouch making line is required and since the dual filling lines can be constructed less expensively than two single filling lines. In addition, a dual lane machine requires significantly less floor space and less operator attention than two single lane machines.

SUMMARY OF THE INVENTION

The general aim of the present invention is to provide a new and simplified dual lane packaging machine of the above character which maintains better control of the pouches as the latter are divided into two rows and which, at the same time, is capable of advancing the web and the strip of interconnected pouches at a uniformly high speed without adversely stressing the web or the strip.

A further object is to simplify the machine and to maintain better control of the pouches during their transfer from a single pouch making line to dual filling lines by carrying out the transfer prior to severance of the pouches from the interconnected strip of pouches.

A related and more detailed object is to shuttle the leading end portion of the interconnected strip of pouches back and forth between the filling lines and to sever the leading pouches from the strip only after control of such pouches has been taken over by the filling lines.

Still a further object is to eliminate the need for intermediate transfer apparatus for shifting the pouches from the single pouch making line to the dual filling line.

The invention is further characterized by the novel mounting and actuation of mechanisms for shuttling the strip of pouches back and forth, for keeping the strip taut and the open ends of the pouches spread apart during the shuttling, and for severing the leading pouch from the strip at the end of each shuttle.

Another object of the invention is to reduce the stress applied by the feed rollers to the web and the strip of pouches through the provision of comparatively simple mechanism which positively unwinds the web from the supply roll to avoid jerking the web off of the supply roll with the feed rollers.

A related object is to control the advance of the web with the feed rollers while positively unwinding the web from the supply roll to eliminate the need for the rollers to overcome the inertia of the supply roll and to unwind any significant amount of web from the supply roll.

Still another object is to shorten and simplify the machine by sealing the open ends of the pouches in both rows at a single station located along the filling lines and by operating all of the sealers in the station by an actuating mechanism of reduced complexity.

The invention also resides in the novel and comparatively compact arrangement for opening the pouch grippers of one of the filling lines just prior to the time the grippers take control of the pouches.

These and other objects and advantages of the invention will become more apparent from the following detailed description when taken in conjunction with the accompanying drawings.

BRIEF DESCRIPTION OF THE DRAWINGS

FIGS. 1a and 1b are perspective views schematically showing the upstream and downstream ends, respectively, of a new and improved packaging machine embodying the novel features of the present invention.

FIGS. 2a, 3a, and 4a are perspective views showing the successive positions of various parts of the machine during back and forth shuttling of the pouch strip.

FIGS. 2b, 3b and 4b are schematic top plan views of certain of the aforementioned parts and corresponding in position to FIGS. 2a, 3a and 4a, respectively.

FIG. 5 is a perspective view of mechanism for taking up slack in the pouch strip as the latter is shuttled back and forth.

FIG. 6 is a perspective view of the feed rolls and of a cutter for severing the pouches from the strip.

FIG. 7 is a fragmentary cross-section taken substantially along the line 7—7 of FIG. 6.

FIG. 8 is a view similar to FIG. 7 but showing parts in moved positions.

FIG. 9 is a perspective view of drive mechanism for rotating the feed rollers.

FIG. 10 is a plan view of part of the carrier chain for advancing the pouch grippers.

FIGS. 11 and 12 are fragmentary cross-sections taken substantially along the lines 11—11 and 12—12, respectively, of FIG. 10.

DETAILED DESCRIPTION OF THE PREFERRED EMBODIMENT

General Organization of the Machine

Figure 2A:
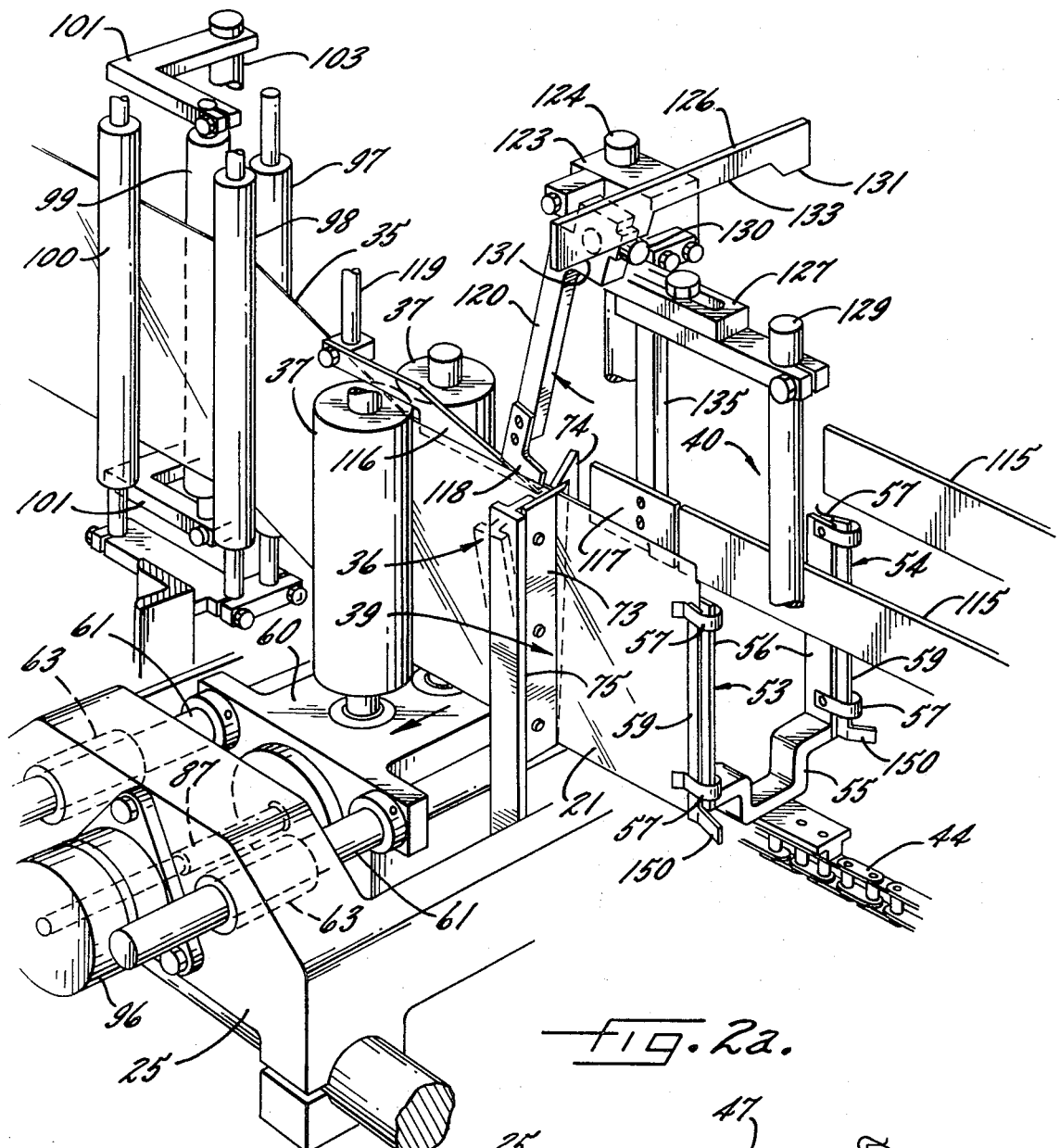

As shown in the drawings for purposes of illustration, the invention is embodied in a dual lane packaging machine 20 (FIGS. 1a and 1b) for forming, filling and sealing substantially flat pouches 21 made of flexible material. The machine which has been illustrated herein is of the intermittent motion type in that the pouch material and pouches are advanced step-by-step through the various stations of the machine and dwell in the stations during performance of the packaging operations.

Figure 17:
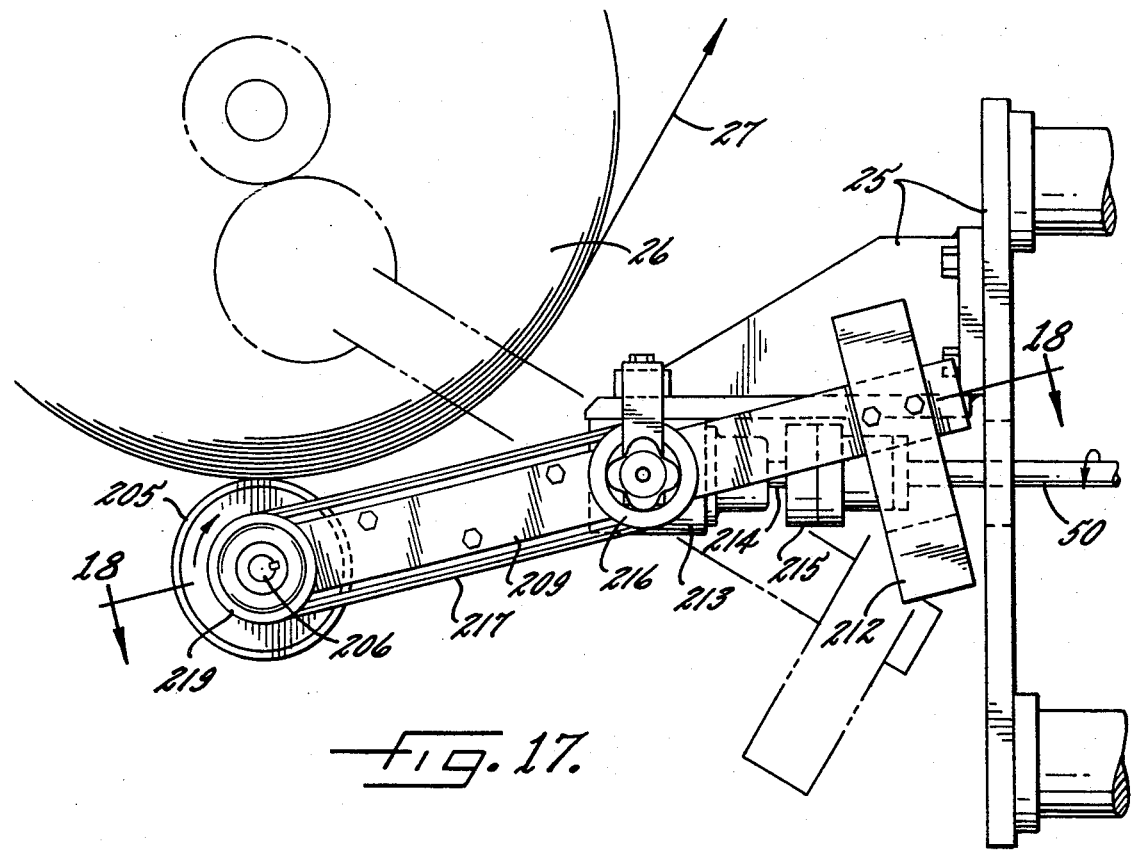
FIG. 17 is a side elevational view of the mechanism for unwinding the web from the supply roll.

More specifically, the machine 20 includes an elongated main support or frame made up of a number of stationary frame members which, for the most part, have all been indicated by the reference numeral 25. For clarity of illustration, most of the frame has been omitted from the drawings. Mounted on one end of the frame 25 is a roll 26 (FIGS. 1a and 17) containing a supply of pouch web 27 made of or coated with heat sealable material, the supply roll being journaled on the frame to turn about a horizontal axis. During operation of the machine 20, the web is unwound from the bottom of the supply roll and is drawn across three vertically fixed guide rollers 29 (FIG. 1a) and a pair of vertically floatable dancer rollers 30 disposed between the fixed rollers. The dancer rollers are similar in construction to those disclosed in Johnson U.S. Pat. No. 3,545,166 and are spring-loaded in a downward direction so as to maintain tension on the web while temporarily storing short lengths of the web between the time the web is unwound from the supply roll and the time the web is advanced further in a downstream direction. In brief, the dancer rollers shift downwardly under the spring bias to accumulate the web unwound from the supply roll and then are drawn upwardly as the web is advanced downstream and stripped from the rollers. Reference may be made to the Johnson patent for a more detailed disclosure of the construction and operation of the dancer rollers.

After being stripped from the dancer rollers 30, the web 27 is drawn beneath a downwardly inclined V-shaped plow 31 (FIG. 1a) which serves to fold the web upwardly along its longitudinal centerline to form the web into a pair of side-by-side panels joined by a bottom fold, the panels and the fold ultimately defining the side panels and the closed bottoms of the finished pouches 21. As the folded web periodically dwells downstream of the plow, vertical heat sealing bars 33 close upon the web and form upright side seals 34 at longitudinally spaced locations along the web thereby to seal the two panels together and convert the web into a strip 35 of interconnected pouches whose open ends face upwardly during edgewise advance of the pouches along a horizontal path toward a cutter 36 located downstream of the seal bars. The cutter operates periodically to sever each successive leading pouch 21 from the strip 35 by cutting through the strip at the middle of each side seal 34. To draw the web 27 beneath the plow 31 and to advance the strip of pouches past the side sealing bars 33 and the cutter 36, a pair of upright feed rolls 37 are located just upstream of the cutter on opposite sides of the strip and are rotated intermittently to cause step-by-step advance of the strip and the web.

Alternate pouches 21 severed from the strip 35 are divided into two laterally spaced side-by-side rows at front and rear horizontally spaced pickup stations 39 and 40 (FIG. 4b) located just downstream of the cutter 36 and, while in such rows, the pouches are advanced intermittently and in spaced edgewise relationship through downstream stations where fillers 41 (FIG. 1b) located above each row deposit product in the pouches and top sealing mechanism 43 discloses the upper end of the pouches. To advance the separated pouches, an endless chain 44 disposed in a horizontal plane is trained around a downstream drive sprocket 45 and a pair of upstream guide sprockets 46 and 47 (see FIGS. 1a, 1b and 10) which are all journaled on the frame 25 to turn about upright axes, the axis of the guide sprocket 46 being located just rearwardly of the rear pickup station 40. The chain is driven step-by-step with a Geneva drive unit 49 (FIG. 1b) which is powered by an elongated cycle shaft 50 adapted to be rotated continuously by a main drive motor 51 (FIG. 1a) and extending along the longitudinal centerline of the machine 20 from a point near the downstream end of the chain to a point near the plow 31. The longitudinal centerline of the machine lies in the same vertical plane occupied by the pouch strip 35 when the strip passes between the side sealing bars 33.

Carried on and spaced along the chain 44 are pairs of front and rear gripprs or clamps 53 and 54 (FIG. 2a) which hold the pouches 21 for edgewise advancement with the chain. As shown in FIGS. 2a and 10, the front and rear clamps of each pair are mounted on a single U-shaped yoke 55 secured to the chain and each clamp comprises a fixed jaw 56 upstanding from the yoke. Two movable jaws 57 formed by vertically spaced spring metal clips are secured to each fixed jaw and are adapted to be opened relative to the fixed jaw when flexed away from the fixed jaw by actuation of a lever 59 pivoted on the fixed jaw, the movable jaws closing by virtue of their own resiliency when the lever is released. Consecutive pairs of front and rear clamps 53 and 54 dwell successively in the front and rear pickup stations 39 and 40, respectively, to receive the separated pouches 21 and, when in the stations, the clamps of each set are spaced equidistantly on opposite sides of the longitidudinal centerline of the machine 20.

The packaging machine 20 thus described is called a dual lane machine becuase the chain 44 advances the pouches 21 in two side-by-side rows as the pouches are filled and their tops are sealed. The filling operation is inherently slower than the pouch forming operations and thus the chain can advance the pouches to and from the fillers 41 only at a relatively slow cycle rate as compared to the rate of advance of the strip 35 connected pouches past the side sealers 33 and cutter 36. In this particular instance, the strip 35 of pouches is advanced at a rate to deliver a total of 200 pouches per minute to the pickup stations 39 and 40 whle the chain 44 cycles at a rate to advance 100 pouches per minute from each pickup station and past each filler. Because, however, the pouches are advanced in two rows and past two fillers, the chain can accommodate all of the pouches delivered into the pickup stations and thus the total output of the machine is 200 pounds per minute. A dual lane machine of this type thus can substantially match the total output of two separate single lane machines while requiring less floor space and less operator attention and while being simpler in construction since only a single pouch forming line is necessary.

SHUTTLING THE POUCH STRIP

In its primary aspect, the present invention contemplates the provision of a new and improved dual lane packaging machine 20 in which the leading end portion of the strip 35 of connected pouches 21 is physically shuttled back and forth between the front and rear pickup stations 39 and 40 and in which the pouches are positively gripped by the clamps 53 and 54 in the pickup stations before the pouches are cut from the strip. With the clamps gripping and taking over control of the pouches prior to cutoff, there is less danger of the pouches being dropped than is the case with certain prior dual lane machines in which the pouches are first cut off at a single pickup station and then are divided into two rows by a separate shuttling transfer device. Moreover, the need for such a device is eliminated.

Figure 2B:
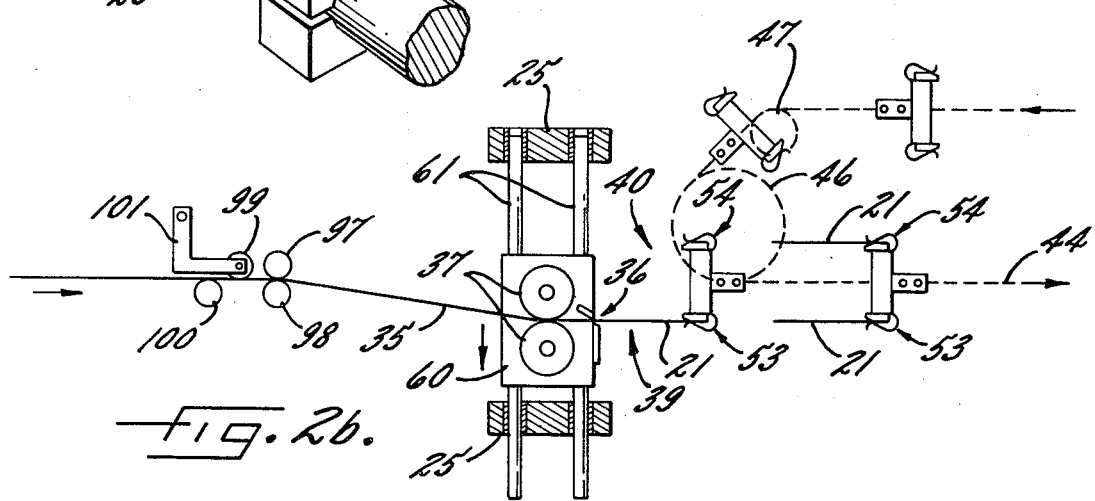

In order to shuttle the pouch strip 35 back and forth between the pickup stations 39 and 40, the cutter 36 and the feed rolls 37 are mounted on a horizontally movable carriage 60 (FIGS. 2a and 2b) which is adapted to shift transversely back and forth beneath the strip. As the carriage advances from back to front (see FIGS. 2a and 2b), the laterally moving feed rolls 37 swing the leading end portion of the strip forwardly relative to the main trailing portion of the strip and, at the same time, are rotated to advance the strip and present the trailing edge of the leading pouch 21 to the cutter 36. As the carriage reaches its front position (FIGS. 2a and 2b), the leading edge of the leading pouch is delivered into and gripped by the front clamp 53 dwelling in the front pickup station 39. Rotation of the feed rolls is stopped while the carriage dwells in its front position and, during the dwell period, the cutter severs the gripped leading pouch from the strip. The carriage then begins moving from front to rear to swing the leading end portion of the strip rearwardly, the feed rolls first bringing the leading end portion of the strip into alinement with the trailing portion and the longitudinal centerline of the machine 20 (see FIGS. 3a and 3b) and then swinging or deflecting the leading end portion rearwardly of the trailing portion (see FIGS. 4a and 4b).

During their front-to-rear movement, the feed rolls 37 are rotated to advance the next leading pouch 21 to the cutter 36 and to deliver the leading edge of such pouch toward the rear clamp 54 dwelling in the rear pickup station 40. When the carriage 60 reaches and dwells in its rear position (see FIGS. 4a and 4b), rotation of the feed rolls is stopped, the pouch is gripped by the rear clamp 54, and the cutter then is actuated to sever the pouch from the strip 35. The carriage thereafter moves from rear-to-front and, during such movement, the chain 44 is indexed one step to advance the loaded clamps out of the pickup stations (see FIG. 2b) and to advance an empty set of clamps into the stations preparatory to the delivery of the next pouch to the front station 39. Accordingly, for each advance of the chain 44, the leading portion of the pouch strip is shuttled through one back and forth cycle and is advanced two steps so that the leading pouches are delivered alternately to the front and rear clamps and are divided into two rows, the cutting of the pouches from the strip occurring just after the pouches have been gripped by the clamps. Positive control of the pouches thus is maintained at all times and, in addition, the feed rolls themselves are used to shuttle the strip to divide the pouches into two rows.

As shown in FIG. 2a, the carriage 60 is supported for back and forth shifting by a pair of horizontal rods 61 anchored to the carriage and guided slidably within ball bushings 63 supported on the fixed frame 25. To shift the carriage back and forth on the frame, an upright lever 64 (FIGS. 6 to 8) is connected pivotally at its lower end to the frame at 65 and is connected at its upper end to one side of the carriage by a pivotal link 66. A roller 67 is journaled intermediate the ends of the lever and rides in a track 69 formed in one side of a cam 70 which is fast on the rotatable cycle shaft 50. As the cam 70 rotates, the lever 64 is rocked first in one direction and then the other about the pivot 65 and acts through the link 66 to shift the carriage 60 back and forth as shown in FIGS. 7 and 8.

Actuating the Cutter

The cutter 36 is located near the downstream end of the carriage 60 and comprises swingable and fixed blades 73 and 74 (FIGS. 2a, 6 and 7) disposed on opposite sides of the pouch strip 35. The fixed blade is anchored in a stationary position on the carriage while the swingable blade is mounted on the upper end portion of a pivoted arm 75 and is adapted to be swung toward and away from the fixed blade to cut off the leading pouch 21 and then allow the strip to advance between the blades. Herein, the arm 75 is pivoted intermediate its ends to the downstream end of the carriage at 76 (FIGS. 6 and 7) and carries a roller follower 77 on its lower end. A spring 78 is compressed between the arm and the carriage and urges the follower against the periphery of a rotatable cam 79 on the cycle shaft 50. Advantageously, the cam 79 is specially contoured not only to actuate the swingable blade 73 by swinging the arm 75 back and forth once each time the carriage is in its front and rear positions but, in addition, to remain in contact with the follower 77 at all times as the arm shifts back and forth with the carriage. Accordingly, the follower 77 continuously rides on the cam 79 as the carriage shifts back and forth and as the cam rotates to periodically actuate the swingable blade (see FIGS. 7 and 8).

Rotating the Feed Rolls

Rotation of the feed rolls 37 is effected by the cycle shaft 50 and, for this purpose, a chain 80 (FIGS. 1a and 9) is connected between the cycle shaft and a right angle gear box 81 on the frame 25 and turns the output shaft 83 (FIG. 9) of the gear box through two revolutions for each revolution of the cycle shaft. An adjustable throw crank 84 is fast on the output shaft 83 and serves to oscillate a second crank 88 by way of a pitman 85 connected pivotally between the cranks, the crank 88 being connected to the input of a one-way clutch 86 (such as a Morse No. MI-300 cam clutch) whose output is coupled to one end portion of a rotatable horizontal shaft 87. The other end of the shaft 87 is splined as indicated at 90 in FIGS. 4a and 9 and is telescoped slidably but non-rotatably into a splined sleeve 91 (FIG. 9) journaled within the carriage 60. The sleeve rotates the feed rolls 37 through right angle gearing 93 within the carriage and, by virtue of the splined connection between the sleeve and the shaft 87, the sleeve may slide relative to the shaft during back and forth shifting of the carriage while still maintaining a rotational drive between the shaft and the feed rolls.

In operation, the throw of the crank 84 is adjusted such that, on the active stroke of the pitman 85 when the shaft 87 is rotated in one direction and the clutch 86 is engaged, the feed rolls 37 can be rotated sufficiently far to advance the pouch strip 35 through a distance which is just slightly greater than is necessary to move the strip a distance equal to the width of one of the pouches 21. As the strip nears the end of each step, an electric eye 94 (FIG. 1a) positioned along the path of the strip detects one of a series of target marks 95 printed on the strip and spaced from one another a distance equal to the width of the pouches. Upon detecting the target mark, the electric eye produces a signal energizing an electric brake 96 (FIG. 9) on the shaft 87 and stopping the feed rolls exactly when the pouch strip has been advanced a distance equal to one pouch width. The clutch 86 slips when the brake is energized and as the pitman 85 completes its active stroke and, when the pitman moves through its return stroke, the clutch automatically disengages to avoid rotating the feed rolls reversely. Suitable circuitry (not shown) automatically disengages the brake 96 just before the feed rolls are again rotated at the beginning of the next step.

Other than the splined connection between the shaft 87 and the sleeve 91 to permit transverse movement of the carriage 60, the rotative drive from the cycle shaft 50 to the feed rolls 37 is basically conventional (see U.S. Pat. No. 3,500,726) and has been described only briefly herein. For the purpose of understanding the present invention, it will suffice to say that the feed rolls are periodically rotated sufficiently far to advance the pouch strip 35 a distance equal to the width of each of the pouches 21 and then dwell during operation of the side sealing bars 33 and the cutter 36, there being two step-dwell cycles for each revolution of the cycle shaft 50.

Preventing Slack in the Pouch Strip

Before moving between the feed rolls 37, the pouch strip 35 threads between a pair of upright guide rollers 97 and 98 (FIGS. 2a, 2b and 5) journaled on the stationary frame 25 and located just upstream of the carriage 60. During shuttling of the pouch strip back and forth between the pickup stations 39 and 40 by the feed rolls, the straight line horizontal distance between the guide rollers and the feed rolls decreases as the feed rolls leave one of the pickup stations and approach the longitudinal centerline of the machine 20 (compare FIGS. 2b and 3b), such centerline lying along the undeflected trailing end portion of the pouch strip as mentioned above. The straight line horizontal distance between the guide rollers and the feed rolls then increases as the feed rolls recede from the centerline of the machine and approach the other pickup station (compare FIGS. 3b and 4b).

To prevent slack from developing in the pouch strip 35 as the straight line distance between the guide rollers 97 and 98 and the feed rolls 37 changes, the present invention further contemplates the provision of a unique pivoted take up roller 99 (FIGS. 2a to 5) which swings into and out of pressing engagement with the pouch strip during shuttling of the feed rolls so as to tighten and take up the pouch strip as the feed rolls approach the centerline of the machine and then release the strip as the feed rolls approach the pickup stations 39 and 40. As shown in FIG. 5, the take up roller 99 is located on the same side of the pouch strip as the guide roller 97 and is located between the opposite guide roller 98 and a similar upstream guide roller 100 journaled on the frame 25 and positioned on the same side of the strip as the guide roller 98. The take up roller is journaled by upper and lower L-shaped brackets 101 fast on an upright rod 103 which is journaled in bearings 104 on the frame so as to turn about a vertical axis. The take up roller is adapted to be swung toward and away from the guide rollers 98 and 100 and, for this purpose, a cam 105 on the cycle shaft 50 engages a follower 106 on one end of an arm 107 secured rigidly to the lower end portion of the rod 103, the follower being urged against the cam by a contractile spring 109 stretched between the frame 25 and a second arm 110 attached to the rod. As the cam rotates, the rod is turned back and forth within the bearings 104 to swing the take up roller 99 toward and away from the guide rollers 98 and 100.

Figures 3A, 3B:
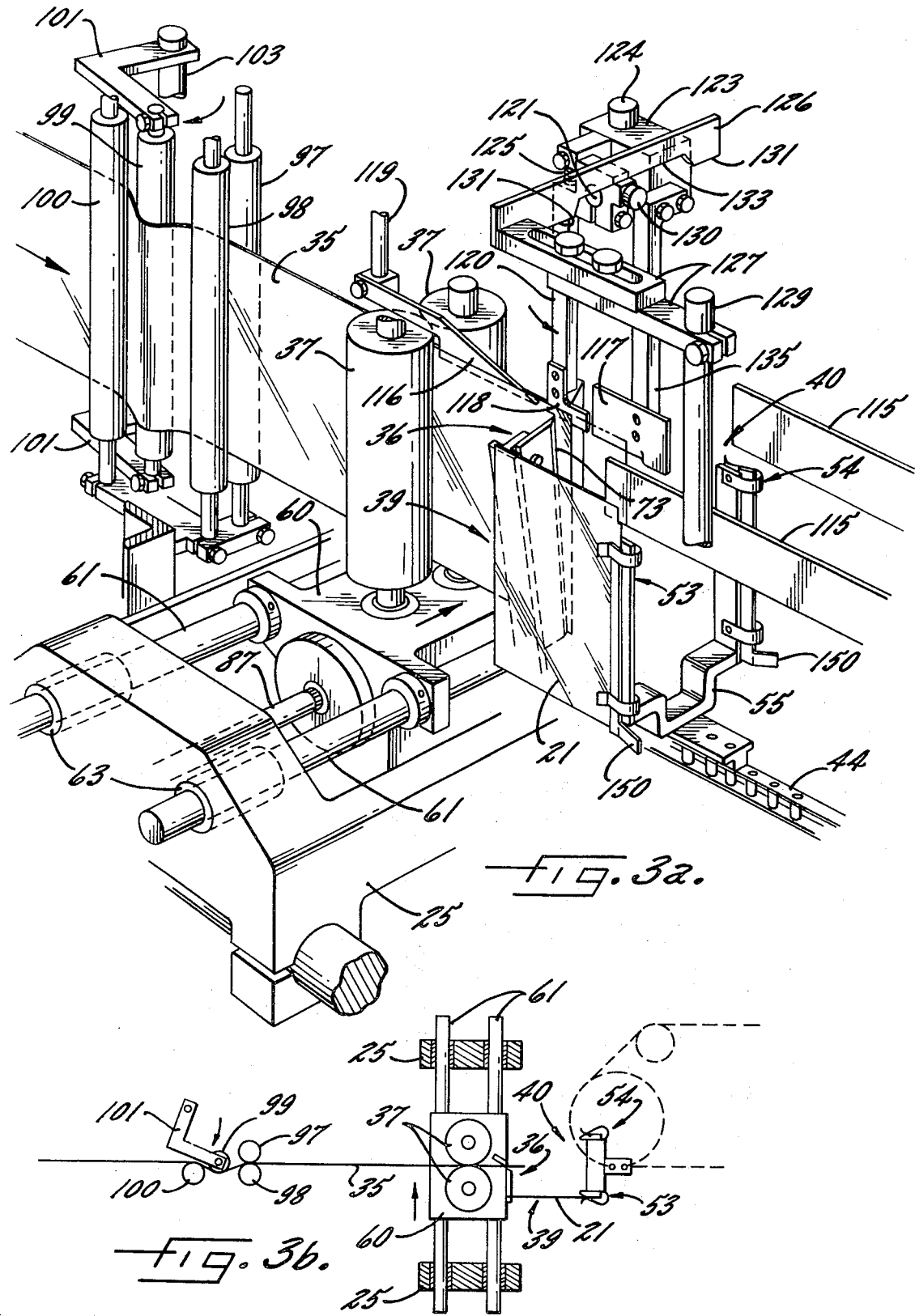
Figure 13:
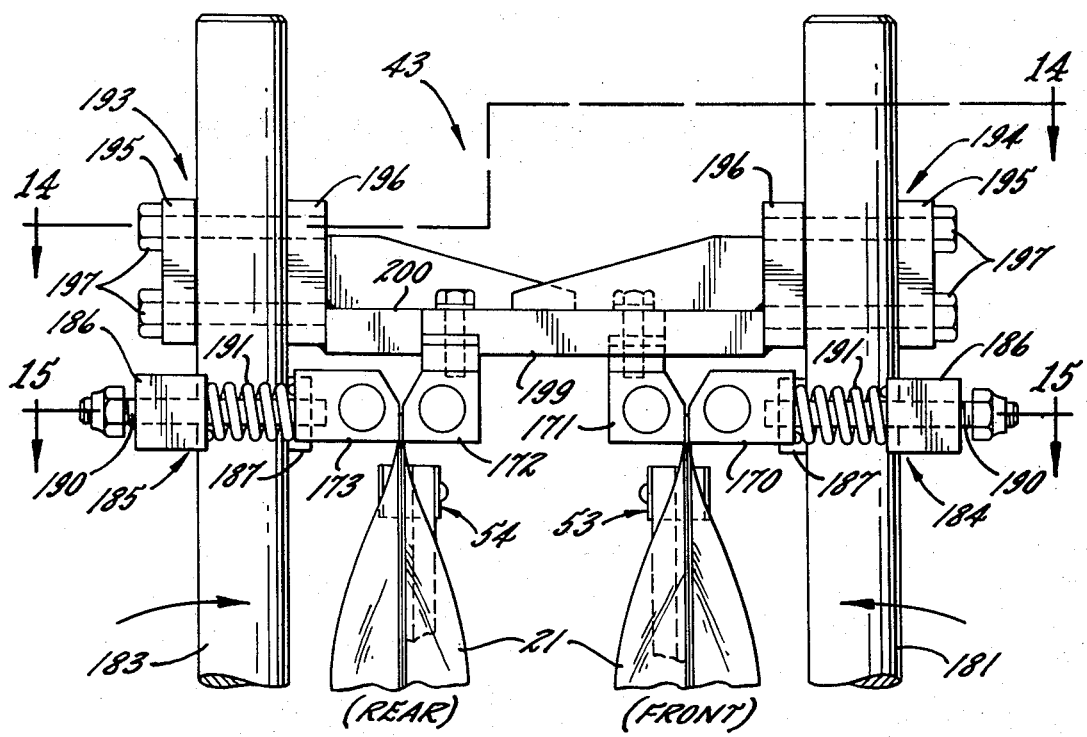
FIG. 13 is an enlarged fragmentary cross-section taken substantially along the line 13—13 of FIG. 1 and showing the sealers for sealing the tops of the pouches.
Figure 14:
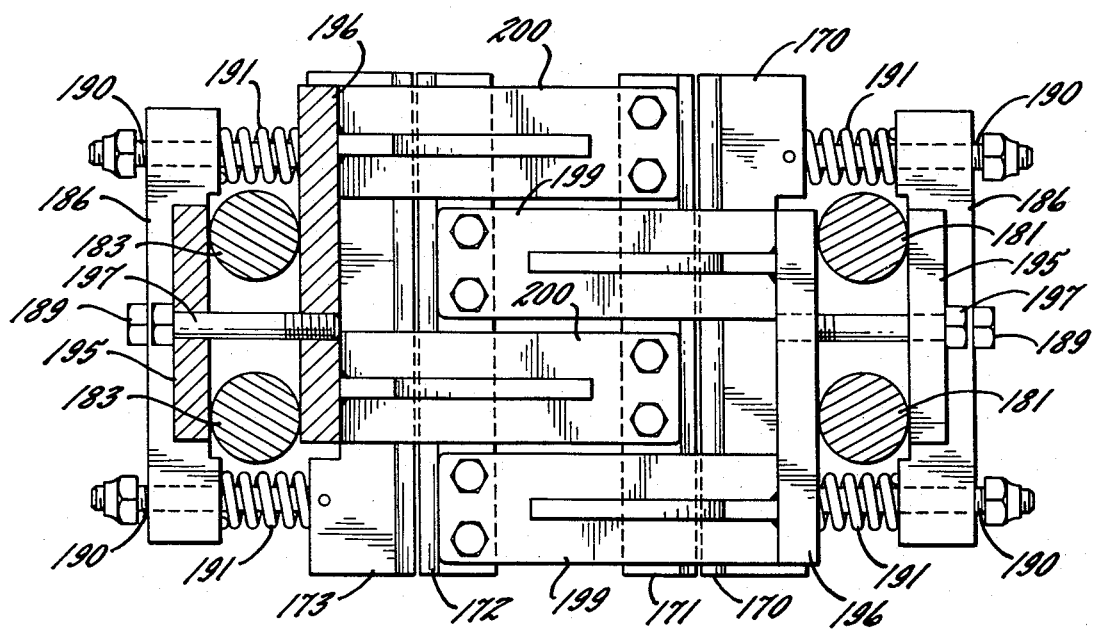
FIGS. 14 and 15 are fragmentary cross-sections taken along the lines 14—14 and 15—15, respectively of FIG. 13.
Figure 15:
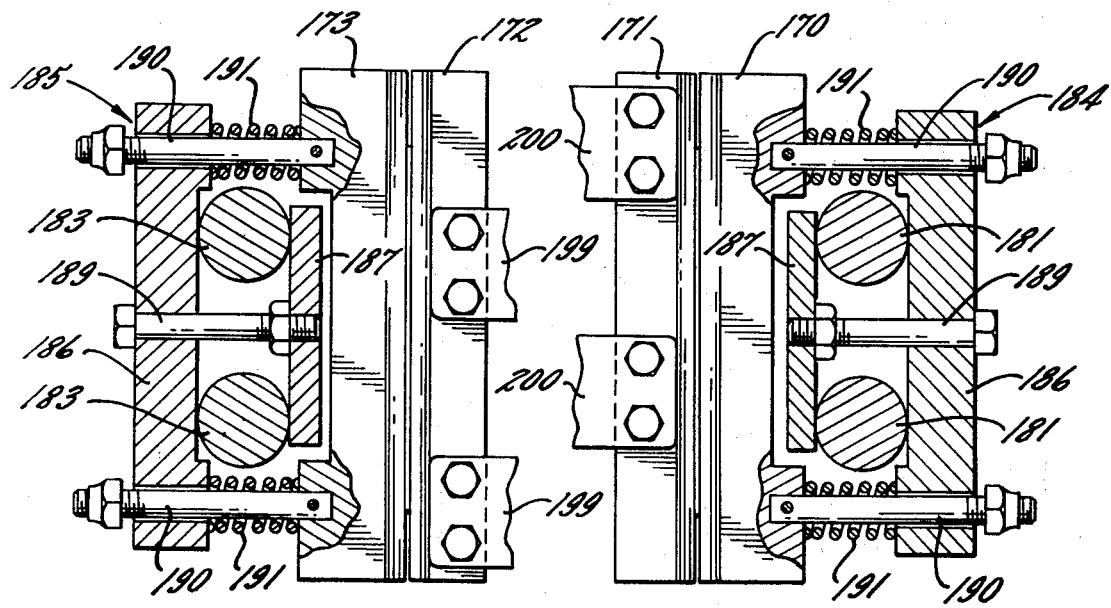
Figure 16:
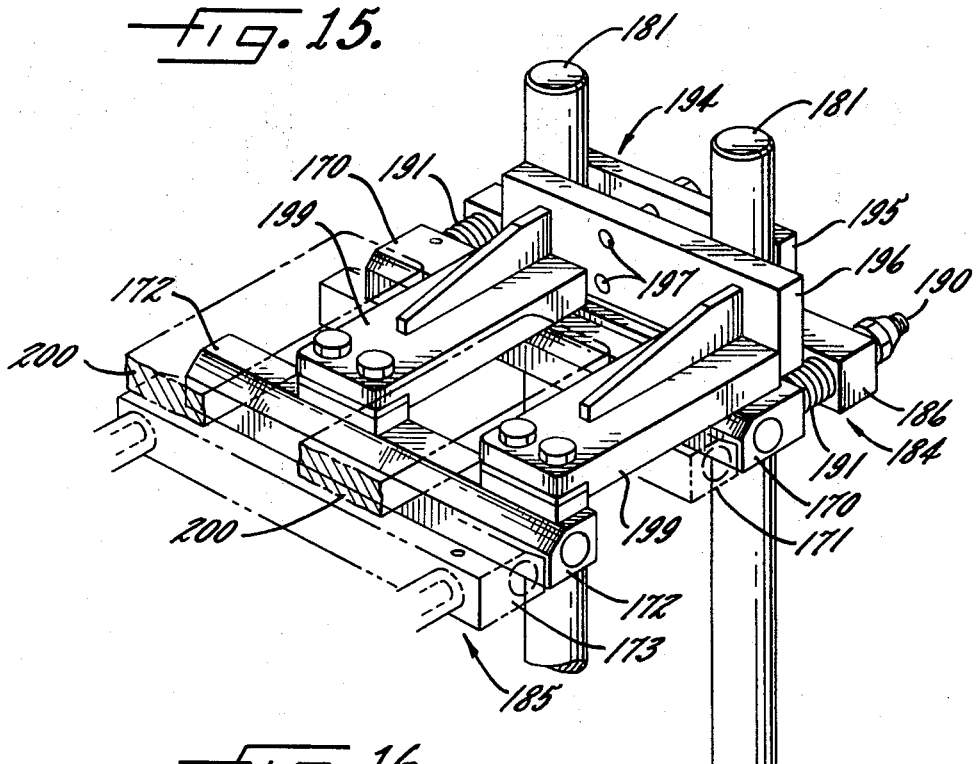
FIG. 16 is a fragmentary perspective view of the top sealers.

During movement of the feed rollers 37 from the front pickup station 39 toward the longitudinal centerline of the machine 20, the take up roller 99 is swung gradually toward and between the guide rollers 98 and 100 and into pressing engagement with the pouch strip 35 so as to deflect and accumulate part of the strip between the rollers 98 nd 100 (see FIGS. 3a and 3b). As a result, no bunching of the strip occurs between the feed rolls and the guide rollers 97 and 98 as the straight line distance between such rolls decreases. As the feed rolls recede from the centerline of the machine and approach the rear pickup station 40, the take up roller 99 is gradually swung away from the guide rollers 98 and 100 and out of pressing engagement with the strip (see FIGS. 4a and 4b) thereby to release the strip accumulated between the rollers and permit such strip to be drawn forwardly as the straight line distance between the feed rolls and the guide rollers 97 and 98 increases. During reverse shuttling of the feed rolls from the rear pickup station 40 to the front pickup station 39, the take up roller 99 is swung back and forth in a similar manner.

Accordingly, it will be apparent tha the take up roller 99 swings back and forth in timed relation with the shuttling of the feed rolls 37 and keeps the strip 35 tight at all times in spite of the changing distance between the feed rolls and the guide rollers 97 and 98. Thus, less jerking and more uniform feeding of the strip occurs and less stress is exerted on the strip as the feed rolls accelerate after each dwell period.

The Splitters

As the pouches 21 are advanced toward the fillers 41 by the chain 44, the upper ends of the side panels of the pouches straddle elongated splitter bars 115 (FIG. 1a) which keep the side panels separated prior to the pouches being opened widely and filled. As shown in FIG. 1a, there is one splitter 115 overlying each row of pouches, the splitters being fixed to the frame 25 and extending from points adjacent the pickup stations 39 and 40 to points just short of the fillers.

According to another aspect of the invention, means are provided on the shiftable carriage 60 for separating or splitting the side panels of the pouches 21 before the latter are severed from the strip 35 and for guiding the pouches onto the fixed splitters 115. Herein, these means comprise upstream and downstream splitters 116 and 117 (FIGS. 2a, 3a and 4a) disposed on opposite sides of a so-called flying splitter 118, all of the splitters 116 to 118 being mounted on and movable with the carriage so as to split the pouches as the pouch strip 35 is shuttled back and forth.

The upstream splitter 116 is in the form of a narrow blade, is located between the feed rolls 37 and the cutter 36 and is mounted rigidly on the carriage 60 by a rod 119 (FIG. 2a). As the pouch strip 35 advances from the feed rolls, the upper ends of the side panels of the pouches move onto and straddle the upstream splitter and are separated by the latter. Thereafter, the pouch strip threads onto the flying splitter 118 which is formed as an L-shaped member whose lower leg is alined with the upstream splitter 116 and is positioned to fit between the side panels of the pouches. Normally, the flying splitter is located between the movable and fixed blades 73 and 74 of the cutter (see FIG. 3a). When, however, the movable blade 73 is swung toward the fixed blade 74 to cut off the leading pouch, the flying splitter is momentarily swung upwardly out of the path of the movable blade so as to clear the latter (see FIGS. 2a and 4a). Once the movable cutter blade has been retracted to its inactive position, the flying splitter is swung back downwardly to its normal position shown in FIG. 3a.

To mount the flying splitter 118 for up and down swinging, an upright arm 120 (FIG. 2a) is mounted pivotally on the carriage 60 and carries the flying splitter on its lower end. As shown in FIG. 3a, the upper end of the arm 120 is clamped rigidly to a pin 121 which is rotatably journaled in a block 123 supported on a post 124 upstanding from the carriage. A coil spring 125 is compressed between the arm 120 and the block 123 and urges the flying splitter to its normal lowered position. In order to swing the flying splitter upwardly, an elongated cam bar 126 extends transversely of the path of the pouches 21 and is supported in a stationary position by a horizontal bracket 127 fixed to an upright rod 129 anchored to the fixed frame 125. When the carriage 60 shuttles back and forth, a roller follower 130 on the arm 120 rides along the lower edge of the cam and, each time the carriage approaches the ends of its forward or reverse strokes, the follower engages and rides beneath one of a pair of downwardly projecting cam lobes 131 formed at the ends of the cam (see FIGS. 2a and 4a). Such engagement causes the flying splitter 118 to swing upwardly about the pin 121 thereby to clear the movable cutter blade 73 when the latter is swung toward the fixed blade 74 during the dwell period of the carriage. Then, as the carriage reverses, the follower 130 moves upwardly into a notch 133 formed in the lower portion of the cam 126 between the lobes 131. As an incident thereto, the spring 125 forces the flying splitter to swing downwardly to its lowered position shown in FIG. 3a until the follower subsequently engages the opposite cam lobe.

When swung upwardly, the flying splitter 118 remains partially between the panels of the pouches 21 and does not completely leave the pouches. To enable upward swinging of the flying splitter while keeping the latter close to the upstream splitter 116, the upper edge of the upstream splitter is tapered downwardly as shown in FIG. 2a.

After passing beneath the flying splitter 118 and before being cut from the strip 35, each leading pouch 21 threads onto the downstream splitter 117 (see FIG. 3a) which is located adjacent to and in alinement with the flying splitter, the downstream splitter being supported on the lower end of a depending arm 135 fixed to the block 123. When the carriage 60 reaches the end of its forward stroke, the downstream splitter 117 alines with the forwardmost one of the fixed splitters 115 and guides the pouch onto the fixed splitter as the pouch is delivered into the clamps 53 (see FIG. 2a). After the pouch has been cut off and as the carriage moves from front to rear, the downstream splitter 117 simply deflects the panels of the clamped pouch through a very slight distance, slips laterally from between the panels, and moves rearwardly with the carriage and into alinement with the rear fixed splitter 115 as shown in FIG. 4a. The downstream splitter thus guides the next leading pouch onto the rear fixed splitter before the pouch is cut from the strip 35.

Accordingly, the various splitters 116 to 118 move back and forth with the carriage 60 and coact with the fixed splitters 115 to keep the panels of the pouches 21 separated from the time the pouches emerge from the feed rolls 37 until just prior to the time the pouches are filled. The upstream splitter 116 initially separates the pouch panels, the flying splitter 118 maintains such separation as the pouches pass between the cutter blades 73 and 74, and the downstream splitter 117 serves to guide the pouches onto the fixed splitters 115.

Actuating the Clamps

After each pair of clamps 53 and 54 has stopped in the pickup stations 39 and 40, the clamps are opened to receive the pouches 21 advanced past the cutter 36 and then are closed to grip the pouches. In order to open and close the clamps, front and rear clamp actuators 139 and 140 (FIGS. 1a, 10 and 11) are mounted in the pickup stations 39 and 40, respectively, and are adapted to be swung toward and away from the clamps as the latter dwell. As shown in FIG. 11, each clamp actuator comprises an upright rod 141 whose midportion is secured to a bracket 143 which is mounted on the frame 25 by a horizontal pivot pin 144 so as to enable swinging of the rods toward and away from the clamps. Cam followers 145 (FIG. 1a) are carried on the lower ends of the rods 141 and are positioned to ride against the peripheries of rotatable cams 146 on the cycle shaft 50, the followers being biased against the cams by a contractile spring 147 stretched between the rods. As the cams rotate, the rods of the actuators 139 and 140 are caused to swing toward and away from the clamps 53 and 54, respectively, dwelling in the pickup stations 39 and 40. When the rods are swung toward the clamps, lugs 149 (FIGS. 10 and 11) on the upper ends of the rods engage tangs 150 (also see FIG. 2a) on the levers 59 of the clamps and cause pivoting of the levers to flex the movable jaws 57 of each clamp away from the fixed jaw 56 and thereby open the clamp. As the lugs 149 are swung away from the tangs 150, the resilient movable jaws 57 pivot the levers 59 reversely and close upon the fixed jaws 56 to grip the pouches 21.

In carrying out another aspect of the invention, the rod 141 of the rear clamp actuator 140 is extended upwardly through a hole 151 in the guide sprocket 46 (see FIGS. 1a, 11 and 12) so that the rod can swing toward and away from the rear clamp 54 when the latter dwells in the rear pickup station 40 in spite of the fact that the sprocket is directly alongside the rear clamp. As shown in FIG. 11, the hole 151 extends vertically through and is located centrally within the sprocket 46. Disposed within the hole 151 is an anti-friction bearing 153 which supports the sprocket rotatably on an tubular hub 154 attached rigidly to the frame 25 by bolts 155 (FIG. 12), the upper side of the sprocket being formed with a counterbore 156 which receives a flange 157 on the upper end of the hub. Wear plates 159 are captivated between the frame 25 and the lower side of the sprocket 46 and also between the flange 157 and the bottom of the counterbore 156 to locate the sprocket vertically on the hub 154.

Formed through the hub 154 is an eccentric, oval-shaped hole 160 (FIGS. 10 to 12) through which the rod 141 of the rear clamp actuator 140 extends. The actuating lug 149 on such rod is located just above the upper end of the hub and is clamped to the upper end of the rod by a bolt 161 which extends through an elongated slot 163 in the lug so as to permit selective adjustment of the lug toward and away from the tang 150 of the rear clamp 54 for initial set up purposes. A U-shaped plate 164 (FIG. 10) whose legs straddle the hole 160 is secured to the flange 157 of the hub 154 by the bolts 155 and is adapted to engage the rear side of the yoke 55 of the clamps 53 and 54 to back the latter when the front clamp actuator 139 is swung into engagement with the front clamp 53. An additional plate 165 (FIG. 11) is attached to a chain guide 166 on the frame 25 and engages the front side of the yoke 55 to back the yoke against the pressure exerted by the rear clamp actuator 140.

The oval hole 160 in the hub 154 is sufficiently large to permit the rod 141 of the rear clamp actuator 140 to swing toward and away from the rear clamps 54 when pivoted about the pin 144 by the cam 146. By virtue of its rod 141 extending upwardly through the sprocket 46, the rear clamp actuator 140 may be operated off of the cycle shaft 50 disposed beneath the chain 44 and yet, at the same time, the lug 149 of the clamp actuator may be located in the proper position above the chain to cause opening and closing of successive rear clamps 54 moved into the rear pickup station 40.

The Top Sealing Mechanism

After the pouches 21 in each row have been filled by the fillers 41, they are advanced to the top sealing mechanism 43 (FIGS. 1b and 13 to 16) where the upper ends of the pouches are sealed closed. The present invention contemplates the provision of a new and improved top sealing mechanism which is capable of sealing the pouches in both rows in a single sealing station along the chain 44. As a result, the need for multiple sealing stations is avoided thereby to shorten the overall length of the machine 20 and to simplify actuation of the sealing mechanism.

Herein, the top sealing mechanism 43 comprises a front pair of heated sealing bars 170 and 171 and a rear pair of similar bars 172 and 173 (FIGS. 13 to 16) all disposed directly in line with one another across the two rows of pouches 21. The bars 170 and 171 coact with one another to seal the upper ends of the pouches in the front row while the bars 172 and 173 coact with one another to seal the pouches in the rear row. The bars of each coacting pair are disposed on the outboard and inboard sides of the respective row of pouches and, to seal each pouch, the bars are adapted to be swung toward one another and into pressing engagement with the pouch. Then, the bars are swung away from one another to release the sealed pouch for advancement with the chain.

To mount the bars 170 to 173 for swinging, a pair of arms 174 and 175 (FIG. 1b) are located in directly opposed relation on opposite sides of the cycle shaft 50 and are connected to the frame 25 to swing about a common horizontal pivot indicated at 176 in FIG. 1b. Roller followers 177 are carried on the lower ends of the arms and are urged against side-by-side cams 179 on the cycle shaft by a contractile spring 180 stretched between the arms. The cams 179 are shaped such that the arms are swung toward one another in unison and also are retracted in unison.

Upstanding from the arm 174 are two rods 181 (FIGS. 1b and 13 to 16) while a similar pair of rods 183 is carried on the arm 175. The outboard seal bars 170 and 173 of the two pairs are attached to the rods 181 and 183, respectively, by separate mounting brackets 184 and 185 (FIG. 15) each comprising a pair of plates 186 and 187 disposed on opposite sides of the rods and clamped thereto by a bolt 189. Two additional bolts 190 extend slidably through each plate 186 and are anchored to the respective outboard seal bar 170, 173. Coil springs 191 are telescoped over the bolts 190 and compressed between the plate 186 and the respective outboard seal bar so that the latter may yield laterally upon pressing the pouch against the associated inboard sealing bar 171 or 172.

The inboard sealing bars 171 and 172 are attached to the rods 183 and 181, respectively, by separate brackets 193 and 194 (FIG. 13) located above the brackets 185 and 184. Each of the brackets 193 and 194 comprises plates 195 and 196 disposed on opposite sides of the respective rods and clamped to the rods by vertically spaced bolts 197. The inboard sealing bar 172 of the rear pair of bars is attached beneath the free ends of two horizontally spaced fingers 199 (FIGS. 14 and 16) which project rearwardly from the plate 196 of the bracket 194 on the forward rods 181. Two similar fingers 200 project forwardly from the plate 196 of the bracket 193 on the rear rods 183 and next interdigitally with the fingers 199. The inboard sealing bar 171 of the front pair of bars is secured to the undersides of the fingers 200 near the free ends thereof.

With the foregoing mounting arrangement, the outboard sealing bar 170 of the front pair and the inboard sealing bar 172 of the rear pair are carried by the rods 181 while the inboard sealing bar 171 of the front pair and the outboard sealing bar 173 of the rear pair are carried on the rear rods 183. When the front and rear rods are swung toward one another, the bars 170 and 171 are moved together to seal the pouch 21 in the front row and, at the same time, the bars 172 and 173 are moved together to seal the pouch in the rear row. Thus, the sealing mechanism is operable to seal the pouches in both rows and yet is very compact and occupies only a single station along the chain 44. In addition, simplified mounting and actuation of the seal bars are achieved since only a single pair of swingable arms 174 and 175 is required rather than two pair of arms as would be the case if the front and rear pouches were sealed in separate stations spaced along the chain.

Unwinding the Web From the Supply Roll

Figure 18:
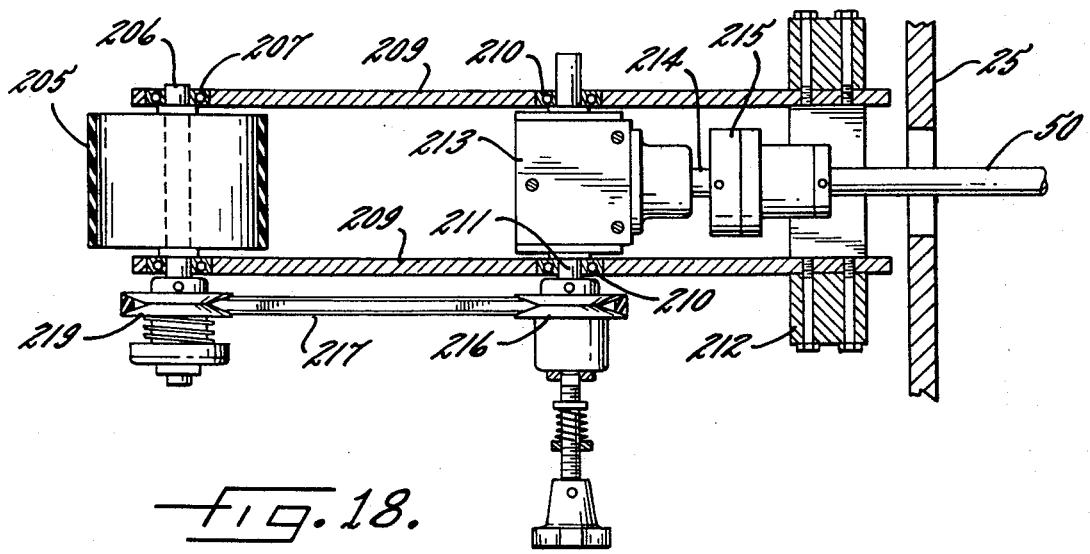
FIG. 18 is a fragmentary cross-section taken substantially along the line 18—18 of FIG. 17.

In still another of its aspects, the present invention contemplates the provision of means for positively rotating the supply roll 26 continuously to assist the feed rolls 37 in unwinding the web 27 from the supply roll so that the feed rolls need not overcome the inertia of the supply roll each time the web is to be advanced. Herein, these means comprise a vertically swingable friction wheel 205 (FIGS. 1a, 17 and 18) which is biased upwardly into engagement with the lower side of the supply roll 26 and which is adapted to be power driven by the cycle shaft 50 so as to turn the supply roll in a direction to unwind the web therefrom.

More specifically, the friction wheel 205 is located beneath the supply roll 26 and is rigid with a horizontal shaft 206 (FIGS. 17 and 18) which is journaled by bearings 207 on the upstream ends of a pair of arms 209. Intermediate their ends, the arms are journaled by bearings 210 to swing vertically about the output shaft 211 of a right angle gear box 213 supported rigidly on the frame 25. A U-shaped counterweight 212 is anchored to the downstream ends of the arms and biases the friction wheel upwardly into pressing engagement with the web 27 on the supply roll.

To rotate the friction wheel 205, the upstream end of the cycle shaft 50 is connected to the input shaft 214 (FIG. 18) of the gear box 213 through a one-way clutch 215. A variable pitch sheave 216 is fast on the output shaft 211 of the gear box and is connected by an endless belt 217 to a spring-loaded sheave 219 on the shaft 206 which supports the friction wheel 205. Thus, the cycle shaft is effective to turn the friction wheel by way of the one-way clutch 215, the gear box 213 and the belt 217. As the friction wheel turns, it rotates the supply roll 26 to unwind the web 27 thereon, the counterweight 212 swinging the wheel upwardly as shown in phantom in FIG. 17 to keep the wheel in constant engagement with the web as the diameter of the supply roll decreases.

In operation, the variable pitch sheave 216 is adjusted such that, for each revolution of the cycle shaft 50, the friction wheel 205 is rotated through an angular distance effective to unwind from the supply roll 26 just slightly less web 27 than is drawn downstream by the feed rolls 37 during the same revolution of the cycle shaft. For each revolution of the cycle shaft of the present machine 20, the feed rolls proceed through two step-dwell cycles and, during this time, the friction wheel pays out slightly less web than is actually drawn downstream by the feed rolls to form two pouches 21. When the feed rolls dwell, the web unwound from the supply roll by the friction wheel is stored or accumulated by the dancer rollers 30 (FIG. 1a). Then, when the feed rolls are rotated, the accumulated web is stripped from the dancer rollers by the feed rolls. After the accumulated web has been drawn off of the dancer rollers, the feed rolls tension and strip a very small amount of web directly from the supply roll since not all of the web needed to form one pouch was unwound previously from the supply roll by the friction wheel. During stripping of the web directly from the supply roll by the feed rolls, the supply roll is rotated somewhat faster than when being driven by the friction wheel and causes the friction wheel to momentarily accelerate the overrun the cycle shaft 50. The one-way clutch 215 between the cycle shaft and the gear box 213 permits such overrunning and, in effect, allows the friction wheel to free-wheel relative to the cycle shaft during stripping of the web from the supply roll by the feed rolls.

With the foregoing arrangement, the supply roll 26 is rotated continuously by the friction wheel 205 and thus the feed rolls 37 need not start up the supply roll and overcome its inertia each time the feed rolls begin to advance the web 27. Accordingly, less jerking of the web occurs and less stress is applied to the web thereby to effect more uniform feeding of the web at high speeds and to avoid the danger of tearing the web. Because the friction wheel pays out less web than is required by the feed rolls, the actual advance of the web is always determined by the feed rolls as controlled by the electric eye 94 and the eye targets 95 so as to insure that an amount of web equal to the width of one pouch 21 will be advanced each time the feed rolls rotate.

We claim:

1. In a packaging machine, the combination of, a support, a carriage on said support, power driven feed mechanism on said carriae for advancing a strip of interconnected, open-ended pouches edgewise along a predetermined path with the open ends of the pouches facing upwardly, a cutter mounted on said carriage downstream of said feed mechanism and periodically operable to sever successive leading pouches from the strip when the pouches are advanced to the cutter, and means for shifting said carriage back and forth on said support and across said path in timed relaion with the advance of the strip and with the operation of the cutter thereby to shift the feed mechanism and cutter laterally back and forth to cause successive leading pouches to be delivered alternately into first and second laterally spaced pickup stations prior to severing of the pouches from the strip.

2. In a packaging machine, the combination of, a support, a carriage on said support, upright feed rolls on said carriage and intermittently rotatable to advance a strip of interconnected, open-ended pouches edgewise and step-by-step along a generally horizontal path with the open ends of the pouches facing upwardly, a cutter mounted on said carriage downstream of said feed rolls and operable to sever the leading pouch from the strip when the latter dwells between sucessive steps, and means for shifting said carriage horizontally back and forth across said path in timed relation with the advance of the strip and the operation of the cutter thereby to shift the feed rolls and the cutter horizontally back and forth to cause successive leading pouches to be delivered alternately into first and second horizontally spaced pickup stations prior to severing of the pouches from the strip.

3. A packaging machine as defined in claim 2 further including mechanism for timing said feed rolls, said cutter and said shifting means such that the shifting means shift the carriage across the path during the advance of the strip and the cutter severs the leading pouch from the strip at the completion of the shift and while the strip is dwelling.

4. A packaging machine as defined in claim 2 in which said cutter includes a blade mounted on said carriage to swing between an inactive position spaced from said strip and an active position for severing the leading pouch from the strip, said machine further including a horizontal power shaft underlying said horizontal path and alined vertically with said path, a cam rotatable with said shaft, a follower operably connected to said blade and positioned to ride on the cam, and said cam being shaped to remain in engagement with said follower at all times as said cutter is shifted horizontally back and forth and to periodically actuate said follower to cause swinging of said blade between said positions.

5. A packaging machine as defined in claim 2 further including a pair of upright guide rolls mounted on said support upstream of said feed rolls and spaced from one another along one side of said strip, an upright take up roll mounted movably on said support on the opposite side of said strip and located between said guide rolls, and means for moving said take up roll toward and away from said guide rolls in timed relation with the advance of the strip.

6. A packaging machine as defined in claim 2 further including first and second upright guide rolls mounted on said support upstream of said feed rolls and disposed in opposing relation to one another on opposite sides of said strip, a third upright guide roll mounted on said support upstream of said first and second guide rolls and disposed on the same side of the strip as said second guide roll, an upright take up roll mounted movably on said support and located between said second and third guide rolls and on the same side of the strip as said first guide roll, and means for moving said take up roll toward said second and third guide rolls and into pressing engagement with said strip during initial movement of said carriage in each transverse direction and for moving said take up roll away from said second and third guide rolls and out of pressing engagement with said strip during final movement of said carriage in each transverse direction.

7. A packaging machine as defined in claim 2 further including an endless chain located downstream of said cutter, and sets of first and second transversely spaced grippers mounted along said chain and sequentially positionable in said pickup stations to receive said pouches prior to cutting of the pouches from said strip.

8. A packaging machine as defined in claim 7 further including a sprocket located in a horizontal plane adjacent said pickup stations for guiding said chain, and means projecting upwardly through said sprocket for opening one gripper of each set of grippers when such grippers are in said pickup stations.

9. A packaging machine as defined in claim 2 further including a supply roll rotatably mounted on said support upstream of said feed rolls for storing a supply of pouch web from which said pouch strip is formed, a friction wheel biased into engagement with the web on said supply roll, and means for continuously rotating said friction wheel to unwind the web on said supply roll.

* * * * *